Aug. 22, 1933.  H. F. GRAY ET AL  1,923,573
PISTON RING
Original Filed July 16, 1932
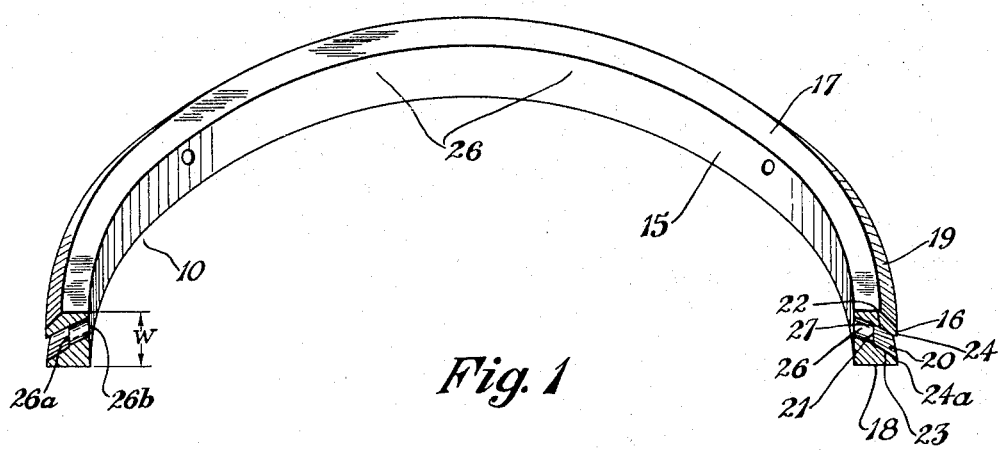
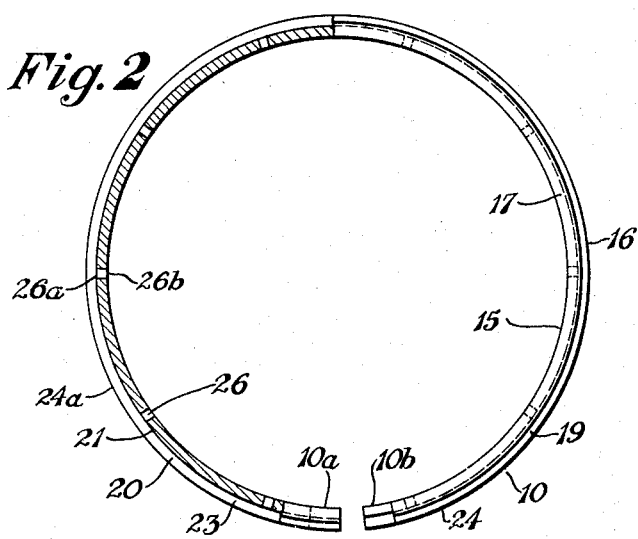
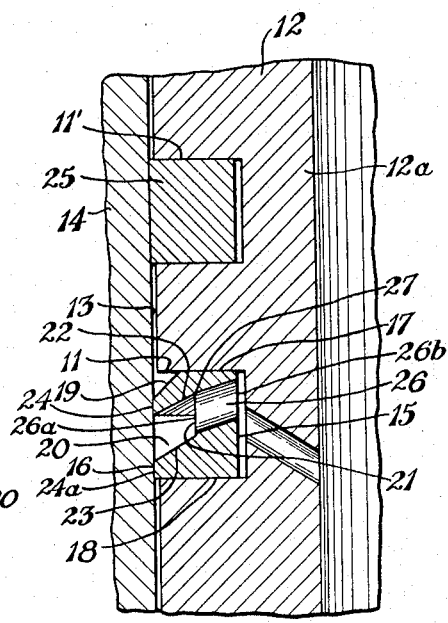
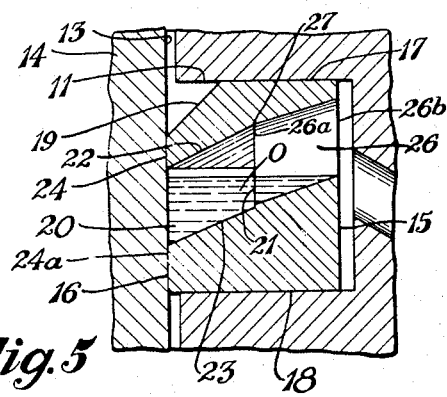
INVENTORS
*Harry F. Gray*
BY *Charles Wenzel*
*Fraser and Bishop* ATTORNEYS Patented Aug. 22, 1933

1,923,573

UNITED STATES PATENT OFFICE 1,923,573

PISTON RING

Harry F. Gray, Brunswick, and Charles Wenzel, Cleveland, Ohio, assignors to The International Piston Ring Company, Cleveland, Ohio, a Corporation of Ohio Continuation of application Serial No. 622,926, July 16, 1932. This application May 4, 1933. Serial No. 669,318

3 Claims. (Cl. 309—45)

Our invention relates to piston rings of the type generally known as oil seal rings, and adapted for use in internal combustion engines or the like, between the pistons and cylinders thereof, and such oil seal rings being adapted primarily for preventing passage of lubricant, usually oil, from the crank cases of the engines, to the combustion chambers, and the present application for United States Letters Patent, of which this specification is a part, is a substitute for and continuation of our prior application for United States Letters Patent for piston rings, filed July 16, 1932, Serial No. 622,926.

Such an oil seal ring is usually located nearest the crank in a groove formed in the skirt of each piston, and one or more compression rings are located each in a similar groove in the skirt of the piston between the oil seal ring and the cylinder head of the engine.

For the proper operation of an engine, it is essential that all the piston rings receive a proper amount of oil, without excess oil being introduced into the combustion chambers.

Oil seal rings as heretofore made have not been satisfactory in attaining proper lubrication not only of the oil seal rings, but also of the compression rings, without at the same time passing an excess of oil into the combustion chambers of the engine.

In oil seal rings as usually and more recently found, particularly in internal combustion engine practice, prior to the present improvements, each of the usual oil seal rings has had formed therein a plurality of slots extending each between the cylinder scraping side surface or outer peripheral face of the ring and the piston side surface of inner peripheral face of the ring, the piston being provided with drain ports communicating with the slots so that oil by-passing through the slots further by-passes through the drain ports back into the crank case of the engine.

It has been the usual practice to provide slots each having a relatively large area of opening in order, according to the usual theory of operation, that excess oil would thus be certain to be by-passed through the slots.

In the actual operation of oil seal rings having the usual relatively large slots, too much oil has been by-passed through the slots, causing at first overheating of the oil seal rings, with a consequent deposition of carbon in the slots which increases to the extent that the slots become clogged with carbon and finally will not by-pass any oil whatever, and then the undesirable excess oil is pumped past the oil seal rings and the compression rings into the combustion chambers.

Accordingly, the objects of the present invention include the provision of an improved piston ring, and more particularly an oil seal piston ring of the oil by-passing type, which is so constructed and which may be so arranged with the piston and cylinder of an internal combustion engine, so that proper lubrication of all the piston rings of the piston will be attained, without passing an undesirable excess of oil into the combustion chamber, without overheating of the oil seal ring, and without clogging of the oil by-passes thereof.

The foregoing, and other objects are attained by the apparatus, parts, improvements, combinations, and sub-combinations, which comprise the present invention, and which are particularly and distinctly pointed out and set forth in the appended claims forming part hereof.

In general terms the present invention may be described as including a piston ring having an outwardly opening annular groove provided in the outer peripheral face of the ring, the groove preferably having frusto-conical side faces tapering when in use in the engine, from the crank case of the engine towards the cylinder head, and the outer peripheral face of the ring having substantial peripheral zones or lands at each side of the groove, and the ring being furthermore provided with a plurality of similarly angled by-pass apertures communicating between the bottom of the groove and the inner peripheral face of the ring, and the apertures being preferably of certain specific cross-sectional areas and being provided in certain definite members for the several standard sizes of piston rings, as hereinafter set forth in greater detail, and the ring being otherwise adapted for being inserted in the usual groove in a usual piston of a usual internal combustion engine, with the outer peripheral face of the ring spring pressed by its own resilience against the inner cylindric surface of the cylinder.

The improved piston ring thus provided with a groove having frusto-conical side faces tapering as aforesaid, and with peripheral lands or zones at each side of the groove, and with the by-passing apertures of limited cross-sectional areas communicating between the bottom of the tapering groove and the inner peripheral face of the ring, results when the ring is in use, in the retention of oil in the groove at all times so that it is substantially at all times approximately half full of oil, and so that at all times the by-pass apertures are wet or full of oil being by-passed therethrough at the proper rate, and consequently the improved ring is maintained at a relatively cool temperature, and the by-passing apertures are always maintained open and do not clog with carbon, since the improved oil cooled ring cannot and does not become overheated, and consequently cannot cause a deposition of carbon.

Preferred embodiments of the improvements are illustrated in the accompanying drawing forming part hereof, in which Figure 1 is an enlarged perspective view of a half-section of one embodiment of the improved ring;

Fig. 2, a fragmentary plan view thereof;

Fig. 3, an elevation view thereoef;

Fig. 4, an enlarged fragmentary vertical sectional view of the improved ring combined with a usual piston, cylinder, and compression ring of an internal combustion engine; and Fig. 5, a still further enlarged fragmentary view of portions of Fig. 4, and more clearly illustrating the structure and mode of operation of the improved ring.

Similar numerals refer to similar parts throughout the drawing.

One embodiment of the improved piston ring of the present invention is indicated generally by 10, and may be made of cast iron by usual piston ring manufacturing methods.

The ring 10, constitutes a curved member, preferably having ends 10a and 10b adapted to overlap each other in use, and the ring 10 is circular when in use in the piston ring groove 11 of an internal combustion engine piston 12, and the ring 10 presses against the inner cylindric surface 13 of the internal combustion engine cylinder 14, in which the piston 12 is operatively mounted in a usual manner.

The piston 12 as illustrated is of usual construction including a longitudinally extending tubular wall 12a in the outer cylindric surface of which the piston ring grooves are formed, and the upper end of which, not shown, is closed with a piston head wall in a usual manner.

The ring 10 before being placed in its groove 11, is curved to a slightly larger diameter than the diameter of the inner cylindric surface 13 of the cylinder 14, so that the resilience of the ring 10 will cause it to fit properly against the cylindric surface 13, all according to usual piston ring practice.

The improved ring 10 is formed with an inner peripheral face 15, an outer peripheral face 16, a normally upper plane side face 17, and a normally lower plane side face 18, the side faces being preferably parallel.

The plane side faces 17 and 18 preferably intersect the inner peripheral face 15, and a preferably frusto-conical bevel face 19 extends between the outer peripheral face 16 and the upper plane side face 17.

The outer peripheral face 16 is preferably provided with an outwardly opening annular groove 20, having a bottom face 21 located intermediate the peripheral faces 15 and 16, and the groove 20 preferably having normally upper and lower frusto-conical side faces 22 and 23 extending between the groove bottom face 21 and the outer peripheral face 16.

The frusto-conical groove faces 22 and 23 taper or slope from the outer peripheral face 16 towards the upper plane side face 17.

The outer peripheral opening of the groove 20 is located between and spaced from the bevel face 19 and the side face 18, and accordingly the outer peripheral face 16 includes a substantial peripheral land or lip zone 24 between the groove side face 22 and the bevel face 19, and also a substantial peripheral land or lip zone 24a between the groove side face 23 and the ring side face 18.

The tapering or sloping groove 20 with the peripheral lands or lip zones 24 and 24a at each side thereof comprises an oil collecting groove which receives oil from the inner surface 13 of the cylinder 14 on each downward stroke of the piston 12.

The oil seal ring 10 is usually associated in the piston 12, with at least one compression ring 25, each of which is located in a groove 11' provided in the piston 12 in the usual manner.

It is necessary that the compression ring or rings 25 of each piston receive adequate lubrication without passing excess oil into the combustion chamber, not shown.

By the improved oil seal ring 10 of the present invention, all and only the excess oil collected in the groove 20 is by-passed back into the engine crank-case, not shown, the groove being at all times substantially half full or more of oil O as illustrated in Fig. 5.

For the purpose of draining only excess oil from the groove, a definite number of by-pass apertures 26, each of a definite cross-sectional area for each standard size piston ring, are preferably provided in the improved ring 10, and each aperture 26 preferably extends between the groove bottom face 21 and the inner peripheral face 15, and preferably the normally upper portion of the inner end of each aperture 26 terminates at the normally upper corner 27 of the groove 20, and each aperture 26 preferably slopes from the groove bottom face 21 normally upwardly towards the upper plane side face 17.

The apertures 26 are preferably drilled holes.

In piston ring practice, the width W of the ring is the distance between the upper and lower plane side faces 17 and 18.

By the present invention it has been discovered that for proper by-passing of the oil as aforesaid, rings of the several standard widths should preferably have apertures 26 whose cross-sectional areas are those of standard drills, according to the following table:

| Width of piston ring | By-pass aperture drill size |
|---|---|
| ¼ inch | No. 57 = 0.0430″ |
| 5⁄32 inch | No. 55 = 0.0520″ |
| 3⁄16 inch | 1⁄16 inch = 0.0625″ |
| ¼ inch | No. 49 = 0.0730″ |

Also, by the present invention it has been discovered that for proper by-passing of the oil as aforesaid, rings in the standard ranges of outside diameters, closed, should each preferably have a total number of the apertures 26, according to the following table:

| Outside diameter range of ring | Number of by-pass apertures |
|---|---|
| 2½″—3½″ | 8 |
| 3½″—4½″ | 10 |
| 4½″—5½″ | 12 |

The sloping apertures 26 as aforesaid, may be described in other terms, each as having an entrance opening 26a located adjacent the groove upper side face 22 and an exit opening 26b in the inner peripheral face 15 of the ring and which is offset from the groove lower face 23 and preferably from the entrance opening 26a in the direction of the normally upper side face 17 of the ring.

By this arrangement of the preferably sloping by-pass apertures 26, and by the provision of the sloping oil sealing groove 20 with the peripheral lands or lip zones 24 and 24a at each side thereof, in the operation of the improved ring the groove 20 is always half full or more of oil thereby maintaining the ring cool, and at the same time effecting proper lubrication of the inner surface 13 of the cylinder 14 and of the compression ring 25, and also at the same time keeping the by-pass apertures 26 always wet with oil by the by-passing surging of oil therethrough on the downward strokes of the piston, and without any deposition of carbon in the apertures 26 or groove 20.

We claim:

1. A piston ring having spaced inner and outer peripheral faces and spaced normally upper and lower side faces extending between the inner and outer peripheral faces, the outer peripheral face having formed therein an outwardly opening annular groove, the groove having a bottom face located between the inner and outer peripheral faces and normally upper and lower side faces extending between the bottom face and the outer peripheral face, the outer peripheral face including a substantial peripheral lip zone at each side of the groove, and the ring having formed therein a plurality of by-pass apertures extending between the bottom face of the groove and the inner peripheral face, the entrance opening of each by-pass aperture in the groove bottom face being located adjacent the groove upper side face and the exit opening of each by-pass aperture in the inner peripheral face being off-set from the groove lower side face in the direction of the upper side face of the ring.

2. A piston ring having spaced inner and outer peripheral faces and spaced normally upper and lower side faces extending between the inner and outer peripheral faces, the outer peripheral face having formed therein an outwardly opening annular groove, the groove having a bottom face located between the inner and outer peripheral faces and normally upper and lower side faces extending between the bottom face and the outer peripheral face, the outer peripheral face including a substantial peripheral lip zone at each side of the groove, and the ring having formed therein a plurality of by-pass apertures extending between the bottom face of the groove and the inner peripheral face, and each by-pass aperture sloping from the groove bottom face towards the ring upper side face.

3. A piston ring having spaced inner and outer peripheral faces and spaced normally upper and lower side faces extending between the inner and outer peripheral faces, the outer peripheral face having formed therein an outwardly opening annular groove, the groove having a bottom face located between the inner and outer peripheral faces and normally upper and lower side faces extending between the bottom face and the outer peripheral face and sloping from the outer peripheral face towards the ring upper side face, the outer peripheral face including a substantial peripheral lip zone at each side of the groove, and the ring having formed therein a plurality of by-pass apertures extending between the bottom face of the groove and the inner peripheral face, and each by-pass aperture sloping from the groove bottom face towards the ring upper side face.

HARRY F. GRAY.
CHARLES WENZEL.